United States Patent [19]

Peregrim et al.

[11] Patent Number: 4,486,756
[45] Date of Patent: Dec. 4, 1984

[54] METHOD OF REDUCING ANGLE NOISE IN A RADAR

[75] Inventors: Theodore J. Peregrim, Bedford; Irving Kanter, Lexington; Rosario Mangiapane, Burlington, all of Mass.

[73] Assignee: Raytheon Company, Lexington, Mass.

[21] Appl. No.: 329,556

[22] Filed: Dec. 4, 1981

[51] Int. Cl.³ .............................................. G01S 13/00
[52] U.S. Cl. ............................. 343/16 M; 343/5 NQ
[58] Field of Search ................ 343/16 M, 17.7, 5 NQ, 343/872, 16 R

[56] References Cited

U.S. PATENT DOCUMENTS

| | | | |
|---|---|---|---|
| B 497,702 | 3/1976 | Breese | 343/16 M X |
| 3,283,322 | 11/1966 | Hovda et al. | 343/16 M |
| 3,940,767 | 2/1976 | Delano et al. | 343/872 X |
| 3,943,508 | 3/1976 | Boucher et al. | 343/16 M X |
| 4,090,066 | 5/1978 | O'Meara | 455/604 |
| 4,194,204 | 3/1980 | Alpers | 343/16 M X |
| 4,296,415 | 10/1981 | Pelton et al. | 343/16 M |
| 4,368,468 | 1/1983 | Lisle et al. | 343/16 M |

Primary Examiner—Maynard R. Wilbur
Assistant Examiner—Brian Steinberger
Attorney, Agent, or Firm—Joseph D. Pannone

[57] ABSTRACT

A method of reducing angle noise in return signals to a monopulse radar having a radome is shown to consist of the steps of: (a) transmitting a pair of signals at frequencies equally spaced above and below the tuning frequency of the radome; (b) digitally processing the return signals to form the complex monopulse ratios of the return signals corresponding to each one of the transmitted signals; (c) determining, by comparing the magnitudes of each monopulse sum and monopulse difference signals with the level of respective predetermined sum and difference reference signals, whether or not angle noise is exhibited and whether or not the signs of the imaginary parts of the monopulse difference signals differ; (d) comparing, to a threshold level, the amplitudes of the monopulse difference signals of those return signals which exhibit angle noise to select return signals exceeding such threshold level and whose signs differ; and, (e) averaging the real parts of the complex monopulse ratios of the return signals which exceed the threshold level finally to produce tracking signals in the presence of angle noise.

3 Claims, 3 Drawing Figures

METHOD OF REDUCING ANGLE NOISE IN A RADAR

BACKGROUND OF THE INVENTION

This invention pertains generally to radar signal processing techniques and in particular to a signal processing technique for reducing glint and cross-polarization errors associated with the radar returns from an extended target.

As is known, the angular location of an extended complex target measured by a radar is partially dependent upon the relative phases and amplitudes of the return signals from different points on such a target. Relative motion between the radar and such a target then causes a change in the aspect angle of the target, with the result that the relative phases and amplitudes of the return signals change in a random way to cause the measured angular location to move in an unpredictable fashion about the centroid of the illuminated area of an extended complex target. Such unpredictable movement of the measured angular location is commonly referred to as "glint," or "angle noise," and may be so large that the measured angular location of a target may even lie outside the extremities of the target.

A moment's thought will make it clear that the presence of glint makes it difficult to generate proper guidance signals for a guided missile, especially in the terminal phase of flight of such a missile toward an extended complex target. In such a situation, the occurrence of glint makes it appear that the target has performed a maneuver which it has not; in consequence, the flight path of the guided missile will be incorrectly adjusted to account for a nonexistent maneuver of the target. As a matter of fact, the guided missile may be called upon to perform such violent maneuvers that aerodynamic or tracking capabilities may be exceeded so that a successful intercept may not be carried out.

It is also known that the effect of the radome and antenna (used in all radar-guided missiles) on incident radio frequency energy may cause angle noise, or glint. For convenience, the phenomenon will be called "polarization modulation." That is to say, when return signals from an extended complex target pass through any known type of radome to an antenna, originally depolarized components of such signals may be transformed in an unpredictable manner to cross-polarized and co-polarized components. Again, the deleterious effect of any such unpredictable change must be reduced, if not eliminated, to achieve the desired degree of accuracy in guidance of a guided missile.

SUMMARY OF THE INVENTION

With this background of the invention in mind it is therefore an object of this invention to provide a technique for processing radar return signals from an extended target to reduce the effects of glint.

It is another object of this invention to provide a technique for processing radar return signals from an extended target that reduces the effects of a radome and antenna on the polarization of such return signals.

These and other objects of this invention are generally attained by transmitting energy in an arbitrarily chosen frequency pair symmetrically disposed about the tuning frequency of the radome of a radar and then forming the complex monopulse ratios of the return signals. The sum magnitude and the magnitude of the imaginary part of the complex monopulse ratio, determined for each frequency pair, are subjected to selected thresholds in order to reject erroneous data points. If the selected thresholds are exceeded, then the real part of the complex monopulse ratio is accepted as a valid tracking point or, if the thresholds are not exceeded, the complex monopulse ratios are stored. If both complex monopulse ratios of a frequency pair fail the threshold tests and if the signs of the imaginary parts differ, a glint threshold is introduced. Then, if the absolute magnitude of the difference of the imaginary parts of the complex monopulse ratio determined at each of the two transmitted frequencies is less than the glint threshold, the average of the real parts of the two complex monopulse ratios is accepted as a valid tracking point.

BRIEF DESCRIPTION OF THE DRAWINGS

The aforementioned objects and other features of the invention are explained in the following description taken in connection with the accompanying drawings, wherein.

DESCRIPTION OF THE PREFERRED EMBODIMENT

Figure 1:
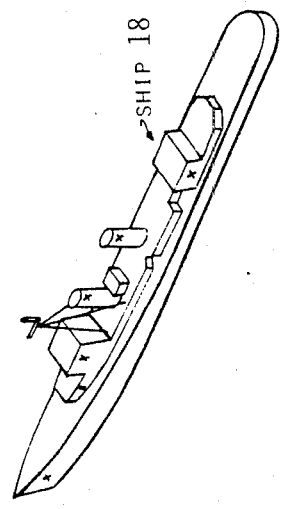
FIG. 1 is a simplified sketch illustrating a missile equipped with an active radar attacking a ship.
Figure 1:
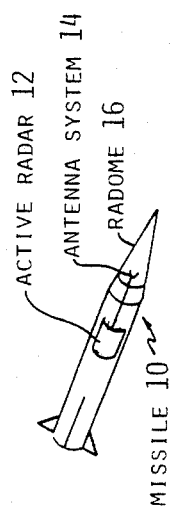

Referring now to FIG. 1, an exemplary engagement according to the herein-contemplated invention is illustrated. Thus, a missile 10 having an active radar 12 incorporating an antenna system 14 disposed behind a radome 16 is shown to be attacking an extended complex target, here a ship 18. The beamwidth of the antenna system 14 is shown to be such as to illuminate the entire ship 18. To the radar, the ship 18 appears as many individual scatterers, such as are generally designated by X's, that contribute to a composite radar return signal. Temporal and unpredictable changes in the relative phases and amplitudes of the returns from the individual scatterers and the angular separation between such scatterers give rise to the problem of glint, while the radome 16 and antenna system 14 give rise to polarization modulation.

Figure 2:
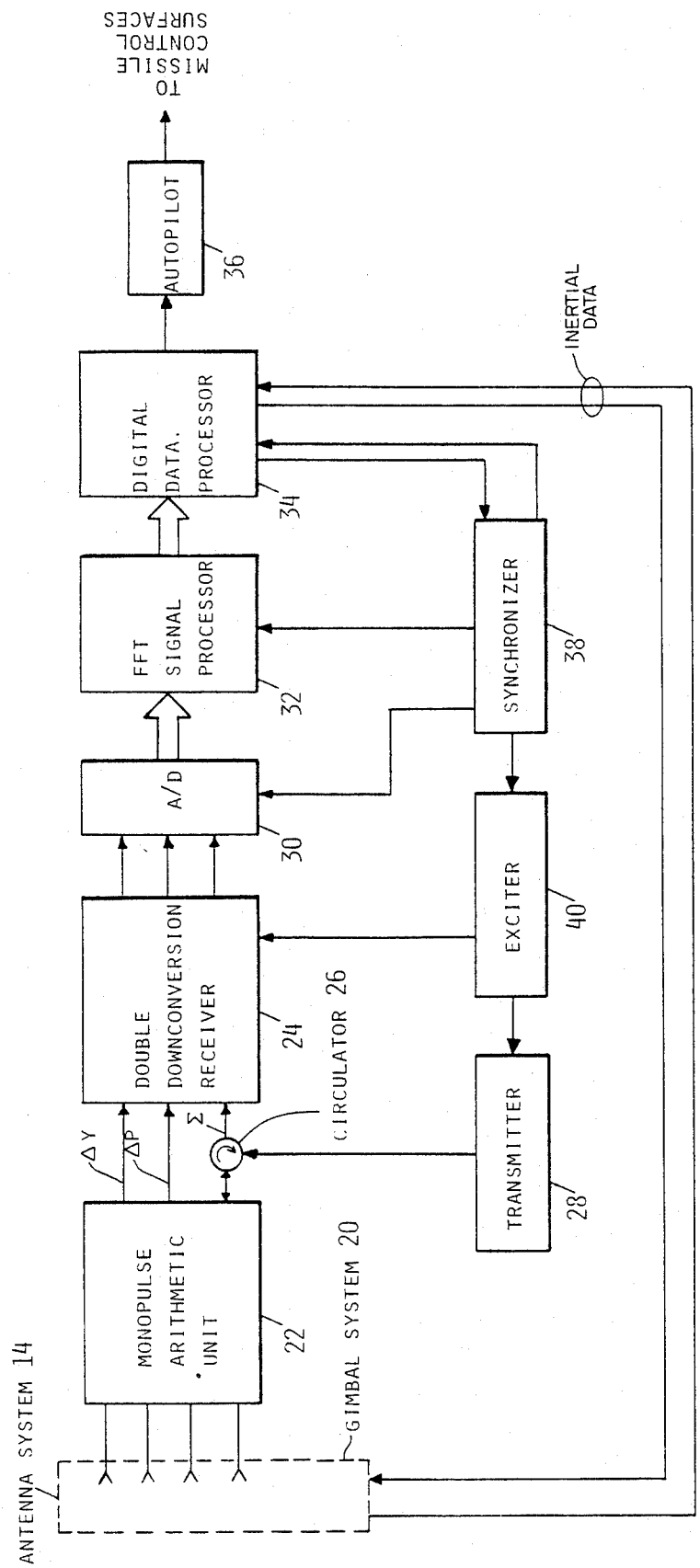
FIG. 2 is a simplified block diagram of the active radar employed by the missile of FIG. 1.

Referring now to FIG. 2, the active radar 12 is shown to include the antenna system 14 which is mounted on a gimbal system 20 that includes a conventional inertial platform or inertial measurement unit (not shown). The output signals from the antenna system 14 are passed to a conventional monopulse arithmetic unit 22 which is effective to form the monopulse sum ($\Sigma$) and pitch ($\Delta P$) and yaw ($\Delta Y$) error signals. The pitch and yaw error signals are passed directly to a double downconversion receiver 24 which provides, inter alia, the automatic gain control (AGC) function as well as downconverting the received R.F. signals to corresponding baseband video signals. The sum signal is passed to the double downconversion receiver 24 through a circulator 26 which is provided to allow a transmitter 28 also to be coupled to the antenna system 14. The baseband video signals from the double downconversion receiver 24 are digitized in an analog-to-digital converter (A/D 30) prior to being passed to a Fast Fourier Transform (FFT signal processor 32). The latter, which here may be a Model MARS CP-232 from CNR, Inc., 220 Reservoir St., Needham Heights, MA, processes the return signals corresponding to each transmitted frequency by means of a Fast Fourier Transform (FFT) algorithm which, as is known, is effective to arrange the return signals by frequency for forming cells in a range/Doppler matrix. The return signals in each such cell are then thresholded and return signals exceeding such threshold are processed further in a digital data processor 34 in a manner to be described in detail hereinbelow, to reduce the deleterious effects of glint and polarization modulation. The digital data processor 34, which here may be a Model DEC 1134 from Digital Equipment Corp., Maynard, MA, utilizes the resulting return signals to derive guidance commands to effect an intercept of the target 18 (FIG. 1). Such guidance commands are passed to an autopilot 36 which develops control signals for the control surfaces of the missile 10 (FIG. 1). The digital data processor 34 also provides the requisite control signals for the gimbal assembly 20.

It should be noted here in passing that the data transfer between the digital data processor 34 and the inertial platform (not shown) involves a two-way data transfer path. This is required in the event that the contemplated signal processing technique rejects all of the "currently processed" radar return signals. In this instance, inertial data from the inertial platform (not shown) is used by the digital data processor 34 to close the requisite tracking and control loops and maintain target track until radar return signals from a subsequent dwell are processed.

Completing the active radar 12 are a synchronizer 38 and an exciter 40. The synchronizer 38 provides timing control signals to the A/D converter 30, the FFT signal processor 32, the digital data processor 34 and the exciter 40. The latter generates the two frequencies to be amplified and transmitted by the transmitter 28 as well as the requisite local oscillator frequencies for the double downconversion receiver 24.

Digressing here now for a moment, a few observations that formed the basis for the contemplated glint and polarization modulation reduction technique will be explained. Thus, as mentioned briefly hereinabove, the cross-polarization components generated by extended targets produce effects similar to glint when these cross-polarized components are transformed by the radome 16 (FIG. 1) and the antenna 14 (FIG. 1) into co-polarized components. The resulting boresight error versus frequency response demonstrates an empirically determined tuning behavior (meaning that the boresight error versus frequency response will start out negative, pass through zero and eventually become positive) for cross-polarized target returns incident on the missile radome 16. Fortunately, in known radomes, such error is substantially independent of the orientation of the antenna with the radome. The two transmitted frequencies then may be symmetrically disposed about the zero-crossing frequency for any radome without appreciable error due to any change in the orientation of the antenna.

It is well known that the angular error caused by glint is largest when fading of the received signal strength is experienced. It is also well known that when the radar returns are from a point target, the monopulse ($\Delta/\Sigma$) signal ratio determined by a monopulse receiver is purely real (i.e., the difference and sum signals are in phase or have a phase difference of $\pi$ radians). On the other hand, when the radar returns are from an extended target, the difference and sum signals have relative phases which change as a function of the angular location, strength and phase of the individual scatterers making up the extended target.

For ease of explanation, the contemplated technique will be described, assuming two scatterers in a resolution cell. The returns from the scatterers may be either both co-polarized or one co-polarized and the other cross-polarized with respect to the polarization of the antenna 14. The envelopes of the sum and difference signals received from the scatterers have the following form:

$$\Sigma = A_1 \cos^2 K\alpha_1 e^{j\phi_1} + A_2 \cos^2 K\alpha_2 e^{j\phi_2} \quad (1)$$

$$\Delta = A_1 \sin K\alpha_1 \cos K\alpha_1 e^{j\phi_1} + A_2 \sin K\alpha_2 \cos K\alpha_2 e^{j\phi_2} \quad (2)$$

A is the scatterer amplitude at the principal polarization;
$\alpha$ is the off boresight angle of the scatterer;
$\phi_i$ is the scatterer R.F. phase;
K is the monopulse slope;
$\phi$ is the phase difference between scatterers 1 and 2 (i.e., $\phi = \phi_1 - \phi_2$)
The complex monopulse ratio, r, is defined as:

$$r = \frac{\Delta \Sigma^*}{\Sigma \Sigma^*} = C + jD \quad (3)$$

where the asterisk denotes the complex conjugate.

For the two target return defined in Equations (1) and (2) the real and imaginary parts of r have the form:

$$C = \frac{\tan K_1 \alpha_1 + \tan K\alpha_2}{2} + G(R,\phi) \quad (4)$$

$$D = \frac{2RG(R,\phi)\sin\phi}{(1 - R^2)} \quad (5)$$

where $G(R,\phi)$ is defined as the glint function and can be expressed as:

$$G(R,\phi) = \frac{(\tan K\alpha_1 - \tan K\alpha_2)(1 - R^2)}{2(1 + 2R\cos\phi + R^2)} \quad (6)$$

where R is the scatterer amplitude ratio in the sum channel and is defined as:

$$R = \frac{A_2 \cos^2 K\alpha_2}{A_1 \cos^2 K\alpha_1} \quad (7)$$

and $\phi = \phi_1 - \phi_2$. It should be noted here in passing that the following relation, which is useful in establishing thresholds, holds:

$$G(1/R,\phi) = -G(R,\phi) \quad (8)$$

The magnitude of the sum channel signal from Equation (1) has the form:

$$|\Sigma(R,\phi)| = A_1 \cos^2 K\alpha_1 (1 + 2R \cos \phi + R^2)^{\frac{1}{2}} \quad (9)$$

As may be seen from Equations (5) and (6), for a given amplitude ratio, R, both the glint function and the imaginary part of the complex monopulse ratio depend upon the phase difference, $\phi$, between the two scatterers. For example, if the amplitude ratio, R, approaches unity and $\phi$ approaches $\pi$, both the glint function, $G(R,\phi)$, and the imaginary part, D, of the complex monopulse ratio will approach infinity which results in a large error in the angular estimate as determined by Equation (3). Furthermore, as R approaches unity and $\phi$ approaches $\pi$, the magnitude of the sum channel signal approaches zero as may be seen from Equation (9). The fluctuation in the magnitude of the sum channel signal as a function of R and $\phi$ is known as amplitude scintillation.

Amplitude scintillation and the imaginary part of the complex monopulse ratio all increase as R approaches unity and $\phi$ approaches $\pi$. Therefore, thresholds on the magnitude of the sum channel signal and the magnitude of the imaginary part of the complex monopulse ratio can be set to bound the glint error, i.e., accept the real part, C, of the complex monopulse ratio only when $|\Sigma(R,\phi)| > T_S$ and $|D| < T_D$. Here $T_S$ is the amplitude scintillation threshold and $T_D$ is the threshold on the imaginary part of the complex monopulse ratio.

When polarization modulation or cross-polarized signals are present, the amplitude ratio, R, used in Equation (6) to calculate the glint function is derived from the radome/antenna transformation which has the form:

$$\begin{bmatrix} A_1 \\ A_2 \end{bmatrix} = \begin{bmatrix} H_{11} & H_{12} \\ H_{21} & H_{22} \end{bmatrix} \begin{bmatrix} R_{11} & R_{12} \\ R_{21} & R_{22} \end{bmatrix} \begin{bmatrix} E_V \\ E_H \end{bmatrix} \quad (10)$$

where:

$R_{i,j}$ are the frequency dependent radome coupling matrix elements;

$H_{i,j}$ are the antenna coupling matrix elements; and $E_V$, $E_H$ are the co-polarized and cross-polarized components of the signal incident on the radome.

The frequency dependent radome coupling matrix elements and the antenna coupling matrix elements are empirically determined and are stored in memory within the digital data processor 32.

As mentioned briefly hereinabove, when cross-polarized components are transformed by the radome 16 (FIG. 1) and the antenna 14 (FIG. 1) into co-polarized components, the resulting boresight error versus frequency response demonstrates an empirically observed tuning behavior. Consequently, boresight error measurements within a limited band of frequencies symmetric about the tuning point effectively have odd symmetry. In this instance, Equation (8) indicates that R has been replaced with 1/R. This continuous change requires that R pass through the critical value, unity. It may be seen from Equation (5) that the imaginary part of the complex monopulse ratio, D, is invariant when R is replaced with 1/R, but does change sign as $\phi$ goes through $\pi$. From measured data it was observed that if $A_1$ and $A_2$ are the amplitudes associated with the co-polarized and cross-polarized signals, respectively, then in some instances in the regions where $A_1$ was approximately equal to $A_2$ the phase difference of the two signals passed through $\pi$. When this occurs, the imaginary part, D, of the complex monopulse ratio, r, will change sign, while the magnitude of the glint function will increase and the magnitude of the sum channel will decrease.

Figure 3:
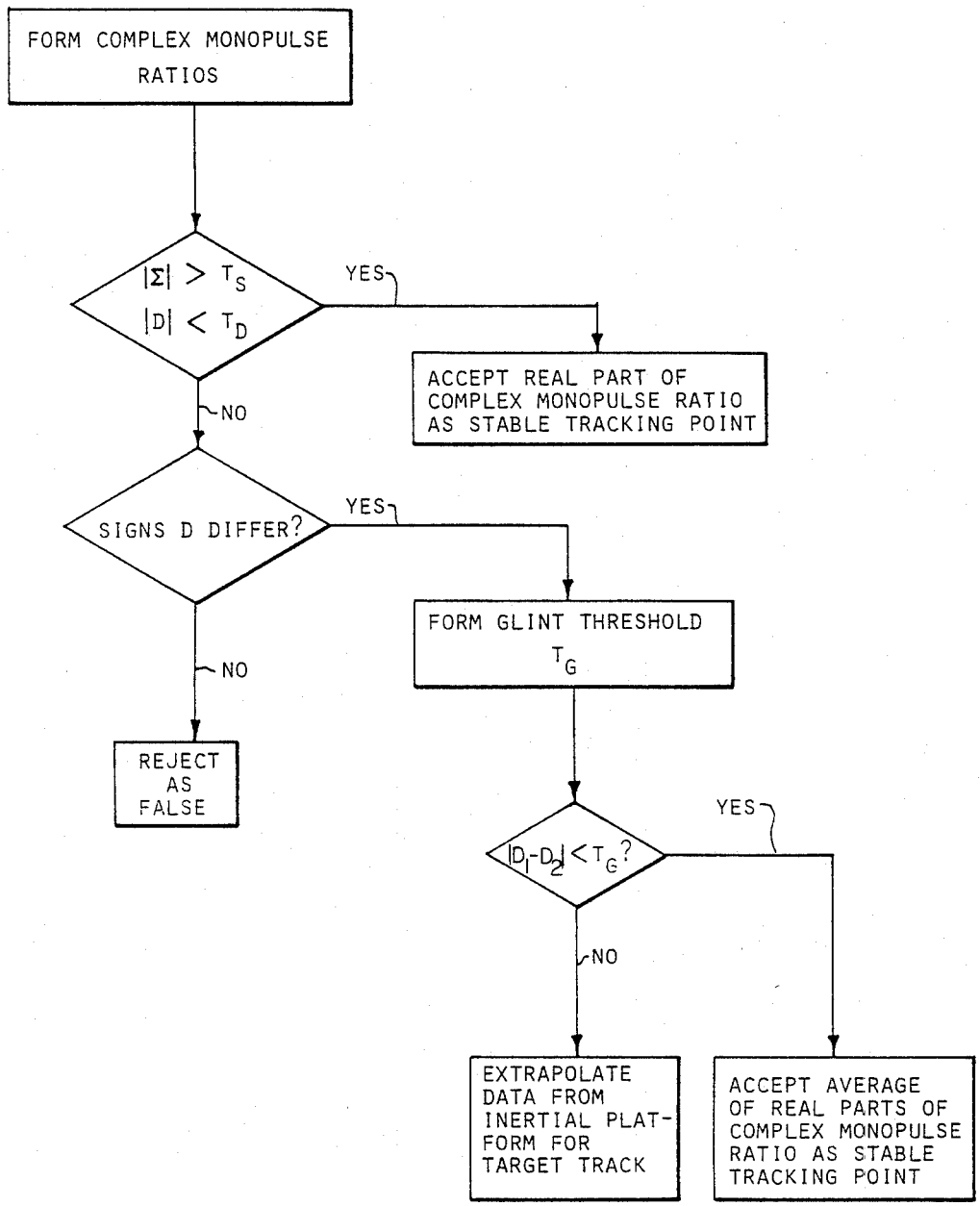
FIG. 3 is a flow diagram useful in understanding the operation of the herein-contemplated signal processing technique.

The foregoing observations and the fact that the boresight errors exhibit odd symmetry about the tuning point formed the basis for the contemplated glint and polarization modulation reduction technique. Referring now to FIG. 3, a signal flow diagram of the contemplated signal processing technique is illustrated. It should be appreciated that a given data point comprises the returns from each of the two transmitted frequencies and that only data points in the range/Doppler matrices (formed by Fourier transforming the return data) that exceed a threshold corresponding to a scaled mean of the background noise are subjected to the contemplated signal processing technique. Additionally, only those points in the difference channel range/Doppler matrices that have exceeded the noise threshold and that have corresponding points in the sum channel range/Doppler matrix that have exceeded the noise threshold are processed. Further, it should be noted that any data point that passes the now to be described processing technique is referred to as a stable tracking point. It will be appreciated that on an extended target there will be at least several stable tracking points and, therefore, a file of such points is maintained within the digital data processor 34 (FIG. 2).

The first step, then, in the contemplated signal processing technique is to form the complex monopulse ratio, in accordance with Equation (3), for each of those data points that have passed the foregoing threshold testing. The magnitude of the sum channel data points and the magnitude of the imaginary part of the complex monopulse ratios are then subjected to a sum channel threshold, $T_S$, and a threshold on the imaginary part, $T_D$, respectively. Both of the foregoing thresholds vary as a function of the missile-to-target range to account for the increase in the sum channel signal-to-noise ratio and the increase in the angular extent of the target with decreasing missile-to-target range. If the magnitude of the sum channel signal for a given data point exceeds the sum channel threshold, $T_S$, and if the imaginary component of the complex monopulse ratio for the same data point is below the threshold, $T_D$, then the real part of the complex monopulse ratio for that data point is accepted as a valid data point for tracking purposes. If the given data point fails either or both of these threshold tests then the signs of the imaginary part of the complex monopulse ratio for each of the two frequencies associated with the data point are compared, and if they differ, a glint threshold is introduced. If, on the other hand, the signs of the imaginary parts are the same, the given data point is rejected as a false data point. The reason for the rejection is that, as mentioned hereinabove, odd symmetry about the radome tuning point is assumed and when a data point does not exhibit this odd symmetry it is rejected as being a false data point.

The glint threshold, $T_G$, is an adaptive threshold predicated on a desired probability of false alarm. The magnitude of the difference of the imaginary parts of the complex monopulse ratios for each of the two frequencies is compared to the glint threshold, $T_G$, and, if less than $T_G$, then the average of the real parts of the complex monopulse ratios for the two frequencies is chosen as a valid data point. Again, because odd symmetry about the radome tuning point is assumed, the average of the real parts of the complex monopulse ratios should provide a stable tracking point. If the magnitude of the difference of the imaginary parts of the complex monopulse ratios is greater than the glint threshold, then that data point is rejected, and if there are no other valid data points, then inertial data from the inertial platform are used by the digital data processor 34 (FIG. 2) to close the requisite tracking loops until valid radar data points are obtained from the next radar dwell.

It should now be appreciated that if there were perfect symmetry about the radome tuning point, the glint functions for each of the transmitted frequencies would be related as in Equation (8) and the imaginary parts of the complex monopulse ratios would be of equal magnitude and opposite sign. In such instance, the magnitude of the difference of the imaginary parts of the complex monopulse ratios would be zero and the glint threshold, $T_G$, could be set to a very small value. If, however, the glint threshold is set too low, then an inordinate amount of otherwise useful data would be rejected.

Having described a preferred embodiment of this invention, it will now be apparent to one of skill in the art that changes may be made without departing from the concepts of this invention. It is felt, therefore, that this invention should not be restricted to its disclosed embodiment, but rather should be limited only by the spirit and scope of the appended claims.

We claim:

1. In a monopulse radar, operating through a radome having a known tuning frequency to illuminate an extended complex target so that return signals may be subjected to glint, a method of reducing boresight errors due to the effect of the radome and antenna on return signals from such target and the shape and aspect of such target, such method comprising the steps of:
   (a) transmitting pairs of interrogating signals, the frequencies of such signals being equally spaced above and below the tuning frequency of the radome;
   (b) for each return signal, forming monopulse sum and difference signals and converting such signals to corresponding complex digital signals having a real and an imaginary part;
   (c) calculating, from the corresponding complex digital signals, the complex monopulse ratio for each return signal;
   (d) comparing the magnitude of the complex digital signal corresponding to the monopulse sum signal to a first threshold signal and the magnitude of the imaginary part of the complex monopulse ratio to a second threshold signal; and
   (e) when the magnitude of the monopulse sum signal is greater than the first threshold signal and when the magnitude of the imaginary part of the complex monopulse ratio is less than the second threshold signal, utilizing the real part of the complex monopulse ratio as a signal to be tracked.

2. The invention as in claim 1 wherein the magnitudes of the first and the second threshold signals are varied with range to the extended complex target.

3. The method as in claim 2 with the additional step of:
   (a) when the magnitude of the monopulse sum signal is less than the first threshold signal or when the magnitude of the imaginary part of the complex monopulse ratio is greater than the second threshold signal, comparing the signs of the imaginary parts of the complex monopulse ratios corresponding to each pair of transmitted signals;
   (b) when the compared signs differ, comparing the imaginary part of each corresponding complex monopulse ratio to a third threshold signal; and
   (c) when the magnitudes of the imaginary parts of each corresponding complex monopulse ratio are less than such the third threshold signal, averaging the real parts of the complex monopulse ratios to derive a signal to be tracked.

* * * * *